United States Patent [19]

Soerens

[11] Patent Number: 4,528,316
[45] Date of Patent: Jul. 9, 1985

[54] CREPING ADHESIVES CONTAINING POLYVINYL ALCOHOL AND CATIONIC POLYAMIDE RESINS

[75] Inventor: Dave A. Soerens, Winnebaco County, Wis.

[73] Assignee: Kimberly-Clark Corporation, Neenah, Wis.

[21] Appl. No.: 661,859

[22] Filed: Oct. 18, 1984

Related U.S. Application Data

[62] Division of Ser. No. 542,918, Oct. 18, 1983, Pat. No. 4,501,640.

[51] Int. Cl.³ .................. C08L 29/04; C08L 77/06
[52] U.S. Cl. ............................. 524/503; 524/606; 525/58
[58] Field of Search ............... 524/503, 606; 525/58

[56] References Cited

U.S. PATENT DOCUMENTS 3,980,605 9/1976 Steigelmann et al. .............. 524/503

Primary Examiner—Harold D. Anderson

[57] ABSTRACT

A creping adhesive comprising an aqueous admixture of polyvinyl alcohol and a water-soluble, thermosetting, cationic polyamide resin provides increased adhesion in the manufacture of creped wadding.

9 Claims, No Drawings

CREPING ADHESIVES CONTAINING POLYVINYL ALCOHOL AND CATIONIC POLYAMIDE RESINS

This is a divisional of co-pending application Ser. No. 542,918 filed on Oct. 18, 1983, now U.S. Pat. No. 4,501,640.

BACKGROUND OF THE INVENTION

In the manufacture of wet laid facial tissue, bathroom tissue, or paper towels it is necessary to crepe the dried fibrous web in order to impart to the web the desired feel characteristics, such as softness and bulk. The creping process involves adhering the web to a rotating creping cylinder, such as a Yankee dryer, and thereafter dislodging the adhered web with a doctor blade. The impact of the web against the doctor blade causes the web to buckle and ruptures some of the fiber-to-fiber bonds within the web. The severity of this creping action is dependent upon a number of factors, including the degree of adhesion between the web and the surface of the creping cylinder. Greater adhesion causes increased softness, although there generally is some loss of strength. In order to increase adhesion, a creping adhesive is generally sprayed onto the surface of the creping cylinder to augment any naturally occurring adhesion which the web may have due to its water content when applied to the creping cylinder. Water content will vary widely depending on the extent to which the web has been previously dried.

A wide variety of creping adhesives are known in the art, such as polyvinyl alcohol, ethylene/vinyl acetate copolymer, animal glue, and polyvinyl acetate, among others. However, a constant effort is being made by tissue manufacturers to find new and better creping adhesives.

SUMMARY OF THE INVENTION

It has now been discovered that a creping adhesive comprising an aqueous admixture of polyvinyl alcohol and an water-soluble, thermosetting, cationic polyamide resin provides increased adhesion of the cellulosic web to the creping cylinder when compared to either component alone and accordingly yields a softer product. It can be used for tissue and paper towel production. The polyvinyl alcohol component can be of any water-soluble molecular weight sufficient to form an adhesive film. Generally, a weight average molecular weight of from about 90,000 to about 140,000 is preferred. Polyvinyl alcohol in solid form is commercially available under several trademarks such as GELVATOL ® (Monsanto) VINOL ® (Air Products) and POVAL ® (KURARAY). Suitable commercially available grades have a viscosity of from about 21 to about 50 centipoise for a 4% aqueous solution at 20° C. These grades have a degree of hydrolysis of from about 80 to about 90 percent. Those skilled in the art will appreciate that lowering the degree of hydrolysis and the molecular weight will improve water solubility but will reduce adhesion. Therefore the properties of the polyvinyl alcohol will have to be optimized for the specific application.

The thermosetting cationic polyamide resin component comprises a water-soluble polymeric reaction product of an epihalohydrin, preferably epichlorohydrin, and a water-soluble polyamide having secondary amine groups derived from a polyalkylene polyamine and a saturated aliphatic dibasic carboxylic acid containing from about 3 to 10 carbon atoms. The water-soluble polyamide contains recurring groups of the formula $$-NH(C_nH_{2n}HN)_x-CORCO-$$

wherein n and x are each 2 or more and R is the divalent hydrocarbon radical of the dibasic carboxylic acid. Resins of this type are commercially available under the trademarks KYMENE ® (Hercules, Inc.) and CASCAMID ® (Borden). An essential characteristic of these resins is that they are phase compatible with the polyvinyl alcohol, i.e., they do not phase-separate in the presence of aqueous polyvinyl alcohol.

The preparation of the cationic polyamide resin component useful for purposes of this invention is more fully described in U.S. Pat. No. 2,926,116 issued to Gerald I. Keim on Feb. 23, 1960, and U.S. Pat. No. 3,058,873 issued to Gerald I. Keim et al. on Oct. 16, 1962, both of which are herein incorporated by reference. Although both of these patents teach only the use of epichlorohydrin as the coreactant with the polyamide, any epihalohydrin is believed to be useful for purposes of this invention since all epihalohydrins should yield a cationic active form of the polyamide resin at the proper pH when reacted with the secondary amine groups of the polyamide.

Therefore, in one aspect the invention resides in an aqueous admixture, useful as a creping adhesive, comprising polyvinyl alcohol and a water-soluble, thermosetting, cationic, polyamide resin, which is the polymeric reaction product of an epihalohydrin and a water-soluble polyamide as herein above described. Preferably, the aqueous admixture contains from about 0.1 to about 4 weight percent solids, most preferably about 0.3 weight percent solids, of which about 30 to about 90 weight percent, preferably from about 70 to about 95 weight percent, and most preferably about 80 weight percent, is polyvinyl alcohol and from about 10 to about 70 weight percent, preferably from about 5 to about 30 weight percent, most preferably about 20 weight percent, is the cationic polyamide resin.

In a further aspect, the invention resides in a method for creping cellulosic webs, such as webs useful for facial tissue, bathroom tissue, or paper towels, comprising: (a) applying to the surface of a creping cylinder an aqueous admixture of polyvinyl alcohol and a water-soluble, thermosetting, cationic, polyamide resin which is the reaction product of an epihalohydrin and a water-soluble polyamide as herein above described; (b) adhering a cellulosic web to the surface of the creping cylinder covered by the abovesaid admixture; and (c) dislodging the adhered web from the creping cylinder with a doctor blade. Those skilled in the art of creping adhesives will appreciate that the reason for such a large percentage of water in the admixture is in part the need to only deposit a very thin layer of adhesive on the creping cylinder, which is most easily accomplished with a spray boom.

While not being limited by any particular theory of operation, it is believed that the use of this particular admixture as a creping adhesive is particularly effective for at least two reasons. The first reason is that polyvinyl alcohol is a rewettable adhesive, whereas the thermosetting cationic polyamide resin is substantially less rewettable. Rewettability is an important characteristic of creping adhesives since only very small amounts of adhesive are added per revolution of the creping cylinder. If any portion of the previously added layer of adhesive is permitted to irreversibly solidify during use, it would thereafter be ineffective as an adhesive. On the other hand, if the newly added adhesive wets the existing adhesive layer, all of the adhesive on the cylinder becomes available to adhere to the web. Since the cationic polyamide component is thermosetting, if used by itself it will eventually cross-link and irreversibly harden and therefore lose its effect as an adhesive. However, by diluting this component with polyvinyl alcohol, wettability is greatly improved and the effective life of the adhesive layer on the creping cylinder is extended.

The second reason believed responsible for the success of the adhesive composition of this invention is that the cationic nature of the cationic polyamide resin component makes it a very specific adhesive for cellulose fibers, whereas the polyvinyl alcohol component is not specific. Therefore combining the two components yields a creping adhesive composition which in a sense combines the attributes of both components to yield a synergistic adhesive effect, i.e. wettability and specificity for cellulose fibers.

DESCRIPTION OF THE PREFERRED EMBODIMENTS

EXAMPLE 1

Adhesion Data

In order to illustrate the synergistic adhesive effect of the compositions of this invention, adhesion data for creping adhesives containing varying amounts of polyvinyl alcohol and the cationic polyamide resin is shown in TABLES I and II. The polyvinyl alcohol component was GELVATOL®2060. The cationic polyamide component was KYMENE®557.

The data in TABLE I was obtained using a laboratory peel strength test procedure. Test samples were prepared by applying an aqueous solution of the test mixture, at 10% solids, to a 2"×5" stainless steel panel, spreading the material with a #26 wire-wound rod, and allowing it to air dry. The panel was placed onto a laboratory hot plate and warmed to a surface temperature of 200° F. A wet cotton cloth (2"×8"), containing approximately 3 times its weight of water, was applied to the hot panel and rolled down with a 2 kilogram cylinder. The panel was left on the hot plate for 2 additional minutes while the cloth and the moistened adhesive dry. The cloth/panel laminate was transferred to an INSTRUMENTORS® Slip/Peel Tester with the heated platen set at 210° F. The cloth was peeled from the panel (180° peel, 6"/minute) and the average peel force was recorded in grams per 2 in. width.

The data in TABLE II was obtained using a more direct method in which the force necessary to continuously remove a web from the surface of a Yankee dryer was actually measured during production on a slow speed (30 ft./min.) pilot scale facility. Specifically, a 15 inch wide cellulosic tissue web having a basis weight of about 15 pounds per 2880 ft.$^2$ was continuously formed in a conventional manner by wet laying a slurry of papermaking fibers onto a continuously moving foraminous fabric. The web was dewatered and transferred to a Yankee dryer by pressing the web onto the surface of the Yankee with a pressure roll. Creping adhesive was continuously sprayed onto the Yankee at a point prior to the point at which the web contacts the surface of the dryer at an add-on rate of about 5 pounds of solids/ton of dry fibers. The web leaving the Yankee was removed from a point on the cylinder just prior to the position of the doctor blade so that creping was avoided. The dried web was wound onto a reel which was mounted on a freely pivotable frame such that the frame was displaced further from vertical (toward the Yankee) as greater force was required to remove the web from the Yankee. This tendency of the frame to be displaced from the vertical position toward the Yankee was counterbalanced by a variable weight and pulley arrangement whereby weights could be added until the amount of weight added equaled the force necessary to pull the web from the surface of the drying cylinder, thereby bringing the frame back to the vertical position. This weight represented the adhesion force (grams) between the web and the surface of the Yankee.

TABLE I

| (Laboratory Peel Strength Test) | | | | | | | | |
|---|---|---|---|---|---|---|---|---|
| Adhesion (grams/2 inch) | 180 | 670 | 750 | 970 | 1110 | 1475 | 1535 | 1200 |
| Polyvinyl alcohol (dry weight percent) | 0 | 30 | 40 | 60 | 70 | 80 | 90 | 100 |
| Kymene 557 (dry weight percent) | 100 | 70 | 60 | 40 | 30 | 20 | 10 | 0 |

TABLE II

| (Continuous In-Line Adhesion Measurement) | | | | | | | |
|---|---|---|---|---|---|---|---|
| Adhesion (grams/15 inch) | 750 | 900 | 910 | 910 | 955 | 1045 | 750 |
| Polyvinyl alcohol (dry weight percent) | 0 | 30 | 50 | 60 | 70 | 80 | 100 |
| Kymene 557 (dry weight percent) | 100 | 70 | 50 | 40 | 30 | 20 | 0 |

Comparison of the data from TABLES I and II shows different absolute values for adhesion, but both methods yield consistent results in that in every instance the level of adhesion is higher for the combination of Kymene and polyvinyl alcohol than would be predicted based on the values of 100% Kymene and 100% polyvinyl alcohol and the percentages of each in the compositions, assuming a linear relationship. Also, both sets of data show a peak adhesion in the range of about 70 to about 95 percent polyvinyl alcohol, in which range the adhesion is greater than either of the individual components. Although graphically not shown, this synergistic effect can be more clearly illustrated by making a plot of adhesion versus composition.

EXAMPLE 2

Production of Facial Tissue

In order to further illustrate the use of the creping adhesives of this invention, facial tissue was prepared by wet-laying a web of papermaking fibers having a dry basis weight of 7.5 lbs./2880 ft.$^2$. The web was dewatered and pressed onto a Yankee dryer with a pressure roll. Adhesive was sprayed onto the surface of the Yankee at the 6:00 o'clock position at an add-on rate of 5 lbs./ton of dry fiber. The composition of the creping adhesive was about 0.3 weight percent solids, excluding a small amount (about 0.03%) of a release agent (mineral oil). The solids consisted essentially of about 80 weight percent polyvinyl alcohol and 20 weight percent KYMENE® (cationic polyamide resin). The dried web was dislodged from the Yankee (creped) with a doctor blade and wound onto a reel spool for converting. The resulting web had a softness rating of 8.5 as determined by a trained sensory panel.

By comparison, a web prepared under similar conditions, but using a creping adhesive consisting essentially of solely KYMEME (without polyvinyl alcohol) and an add-on rate of 2 lbs./ton of dry fiber, had a sensory panel softness rating of 7.8. Higher add-on levels using only KYMENE were not possible without developing an unstable adhesive coating on the Yankee, which caused operational difficulties.

Therefore the use of a creping adhesive consisting essentially of polyvinyl alcohol and a cationic polyamide resin resulted in an improved product with more reliable processing. It will be appreciated that the foregoing examples, shown only for purposes of illustration, are not to be construed as limiting the scope of this invention.

I claim:

1. An aqueous admixture consisting essentially of water, polyvinyl alcohol, and a water-soluble, thermosetting, cationic polyamide resin which is phase-compatible with the polyvinyl alcohol, said cationic polyamide resin comprising the reaction product of an epihalohydrin and a polyamide containing the recurring group

wherein n and x are each 2 or more and R is a saturated aliphatic chain having 3–10 carbon atoms, said admixture containing from about 96 to about 99.9 weight percent water.

2. The admixture of claim 1 consisting essentially of about 70 to about 95 dry weight percent polyvinyl alcohol and about 5 to about 30 dry weight percent of said cationic polyamide resin.

3. The admixture of claim 2 wherein the epihalohydrin is epichlorohydrin.

4. An aqueous admixture, useful as a creping adhesive, containing from about 96 to about 99.9 weight percent water, from about 30 to about 90 weight percent polyvinyl alcohol, and from about 10 to about 70 weight percent of a water-soluble, thermosetting, cationic polyamide resin which is phase-compatible with the polyvinyl alcohol, said cationic polyamide resin comprising the water-soluble reaction product of an epihalohydrin and a polyamide containing secondary amine groups, the ratio of the epihalohydrin to secondary amine groups of said polyamide being from about 0.5:1 to about 1.8:1, said polyamide being obtained by heating together at a temperature of from about 110° C. to about 250° C. a $C_3$–$C_{10}$ saturated aliphatic dibasic carboxylic acid and a polyalkylene polyamine in a mole ratio of polyalkylene polyamine to dibasic acid of from about 0.8:1 to about 1.4:1.

5. The aqueous admixture of claim 4 wherein the halohydrin is epichlorohydrin.

6. The aqueous admixture of claim 5 containing from about 0.1 to about 4 weight percent solids, of which solids from about 70 to about 95 weight percent is polyvinyl alcohol and from about 5 to about 30 weight percent is the cationic polyamide resin.

7. The aqueous admixture of claim 6 containing about 99.9 weight percent water, about 0.08 weight percent polyvinyl alcohol, and about 0.02 weight percent of the cationic polyamide resin.

8. The aqueous admixture of claim 7 wherein the saturated aliphatic dibasic carboxylic acid is adipic acid.

9. The aqueous admixture of claim 8 wherein the polyalkylene polyamine is diethylenetriamine.

* * * * *